United States Patent [19]
Monicault

[11] Patent Number: 5,635,702
[45] Date of Patent: Jun. 3, 1997

[54] MEMORY CARD WITH A PROTECTIVE LAYER ON THE METAL ELECTRICAL CONTACT ZONE

[75] Inventor: André Monicault, Clamart, France

[73] Assignee: Schlumberger Industries, Montrouge, France

[21] Appl. No.: 493,688

[22] Filed: Jun. 22, 1995

[30] Foreign Application Priority Data

Jun. 24, 1994 [FR] France .................................. 94 07906

[51] Int. Cl.$^6$ .................................. G06K 19/067
[52] U.S. Cl. .................................. 235/492; 439/520
[58] Field of Search .................... 235/492; 283/94, 283/903, 111; 439/520

[56] References Cited

U.S. PATENT DOCUMENTS

| | | | |
|---|---|---|---|
| 3,655,456 | 4/1972 | Hamel | 136/181 |
| 4,738,473 | 4/1988 | Meloni et al. | |
| 4,774,399 | 9/1988 | Fujita et al. | 235/441 |
| 4,780,604 | 10/1988 | Hasegawa et al. | 235/492 |
| 4,780,793 | 10/1988 | Ohtsuki | 361/399 |
| 4,889,498 | 12/1989 | Mizuta | 439/86 |
| 5,475,205 | 12/1995 | Behm et al. | 235/375 |

FOREIGN PATENT DOCUMENTS

| | | |
|---|---|---|
| 1-257100 | 7/1988 | Japan . |
| 2149209 | 12/1984 | United Kingdom . |

OTHER PUBLICATIONS

Patent Abstracts of Japan, vol. 10, no. 354 (P-521), 28 Nov. 1986, and JP-A-61 151 791 (Hitachi Ltd.) 10 Jul., 1986.

*Primary Examiner*—Donald T. Hajec
*Assistant Examiner*—Jeffrey R. Filipek

[57] ABSTRACT

A card comprising an electronic module having a memory, into which a designated number of consumable units has been stored, and a metal electrical contact zone. At least one part of the contact zone is covered with a layer of readily removable material which is applied before the card is delivered to points of sale. This material must be removed to enable the card to be read. Once having been removed, the material indicates that the card has been used so that consumer fraud can be prevented in terms of the number of consumable units retained in the memory.

7 Claims, 1 Drawing Sheet

MEMORY CARD WITH A PROTECTIVE LAYER ON THE METAL ELECTRICAL CONTACT ZONE

The present invention relates to a memory card having a metal zone of electrical contacts and, in particular, to such a memory card containing consumable units, e.g. a telephone card.

BACKGROUND OF THE INVENTION

Such memory cards are sold at different points of sale, e.g. post offices, service stations, retailers. The cards contain a fixed, predetermined number of consumable units for which the purchaser and potential user of such a card pays in advance with the expectation of obtaining all of the consumable units.

However, certain fraudulent actions have been reported where retailers, for example, sell ostensibly brand new telephone cards which, in actuality, have already been used. In the course of such use, some of the consumable units are deducted and, therefore, the purchaser obtains less than he has paid for.

To avoid such fraud and guarantee the purchaser of such a telephone card that he is paying for a brand new card with all of its consumable units still stored and available for his use, means are required which, at the moment of purchase, make it easy for the purchaser to detect whether the card has already been used, and without any need to insert said "brand new" card in the nearest telephone.

A method is already known that involves packaging a memory card in a transparent, well-sealed envelope, which makes it impossible to open the envelope without damaging it in a manner that is easily detected by the purchaser.

The drawback of such envelopes is that cards packaged in this way are either thicker or bigger than cards without packaging, or are unusable in existing automatic dispensing machines, or else are too costly. Also, the discard of such packaging increases waste and creates more trash.

OBJECT AND SUMMARY OF THE INVENTION

An object of the present invention is, therefore, to provide an improved card which clearly and reliably indicates if the card has already been used before purchase.

To achieve this object the invention involves a card comprising an electronics module having a memory and a metal electrical contact zone (e.g. contacts), of which at least one part is covered in a layer of readily removable, e.g. scratchable, material which is applied before the card is delivered to points of sale.

It should be understood that when a scratchable layer, which is preferably rubbery, is used as a seal on the contacts of the card, removal of such layer will leave unmistakable traces that the card has been read. The layer is so applied that it is impossible to use such a card without having scratched said layer in order to uncover the contacts.

As demonstrated by scratchable lottery tickets which also utilize such a rubbery seal layer, scratching such a layer is easy and quick to perform.

In the invention, the application of the scratchable layer during the manufacture of the card ensures that when the card leaves the manufacturing site nobody will be able to use it without causing detectable traces of said use on the protective layer.

All scratchable layers of the invention can be printed on the card by screen printing. This makes it easy to obtain a very thin layer so that no modification is required to existing card packaging, nor any modification to card dispenser machines. In addition, screen printing allows any shape or color of printing to be used as decoration for such a card of the invention.

In addition, the waste produced by scratching a scratchable layer is practically zero compared with the above-mentioned envelopes.

BRIEF DESCRIPTION OF THE DRAWING

The invention will be better understood from a reading of the following description of a preferred embodiment of a memory card of the invention, given by way of a non-limiting example, when taken in conjunction with the following drawings.

MORE DETAILED DESCRIPTION

Figure 1:
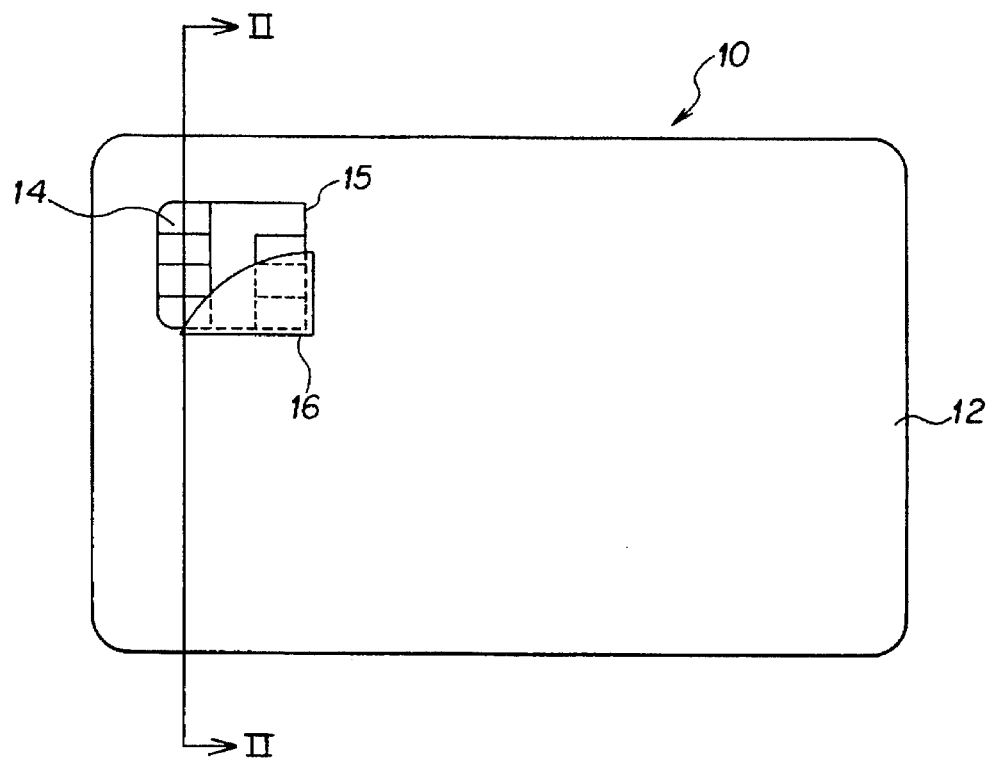
FIG. 1 is a plan view of a card in accordance with the present invention.
Figure 2:
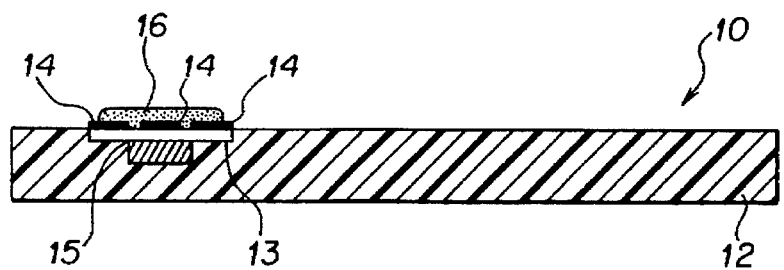
FIG. 2 is a cross-section taken along line II—II of FIG. 1.

FIGS. 1 and 2 show a card 10 that is generally well known in that it includes a plastic body 12 having a cavity 13. Cavity 13 accommodates therein an electronic memory module 15 on which a metal contact zone 14 is arranged. Zone 14 can include, for example, a plurality of contacts arranged in a conventional fashion. Card 10 is designed to be used with any conventional card reader, such as in a payphone.

In accordance with the present invention, contact zone 14 is covered with a readily removable, or scratchable, layer 16 which, as shown in FIG. 1, has already been partly removed in order to uncover the contacts 14.

Layer 16 is an ink called "Screen Printing Ink" available from VFP located in St. Christol-lez-Alès, France. It can be readily removed by scratching it with a fingernail or by rubbing it with a pencil eraser. Layer 16 is applied to card 10 by a conventional process such as that used for lotteries and games.

In accordance with the present invention, layer 16 must cover that portion of card 10 which makes it unusable unless at least part of layer 16 is removed. More specifically, contacts 14 must be cleared of layer 16 in order for data stored in the module 15 to be accessed by the card reader. Consequently, in order to use the card initially, the user must scratch off layer 16 to a degree sufficient for card 10 to be read. This use of the card may, of course, result in some of its consumable units being deducted. Such a used, scratched card will not be marketable as a new card any longer because, with the present invention, absence of at least part of layer 16 therefrom is a clear indication, and warning, to the purchaser that the card has likely been used.

Thus, the present invention attains the significant advantage of fraud prevention by warning consumers that a card may not have all of the consumable units still available from the total number which it originally retained. Furthermore, such advantage is attained without the need to substantially modify the card or complicating its packaging, while at the same time reducing the waste of paper, etc. caused by other such anti-fraud techniques.

Although a preferred embodiment of the present invention has been disclosed, various modifications thereto will be readily apparent. For example, materials other than the "Screen Printing Ink" can be used as long as they satisfy the criteria of being relatively inexpensive to apply during card fabrication, relatively easy for the consumer to remove, and relatively difficult and/or expensive for a defrauding party to reapply after the card has been used. These and other such modifications are intended to fall within the scope of the present invention as defined by the following claims.

I claim:

1. A memory card comprising an electronics module having a memory and a metal electrical contact zone, wherein at least part of said electrical contact zone is covered with a layer of readily scratchable material.

2. A memory card according to claim 1, wherein said layer is a printed-on rubbery, scratchable ink.

3. A memory card according to claim 1, wherein said layer of scratchable material is applied during manufacture of the card.

4. A memory card according to claim 1, wherein the layer is applied to the card by screen printing.

5. A method for preventing fraudulent sales of a memory card, comprising the steps of:

manufacturing a memory card adapted for use with a card reader, said memory card having an electronic memory and a metal electrical contact zone, and covering at least a particular portion of the metal electrical contact zone, which must be engaged by the card reader for accessing the memory, with a layer of scratchable material which prevents such access.

6. The method of claim 5, further comprising the step of removing the layer from said particular portion of the metal electrical contact zone.

7. The method of claim 5, wherein said covering step applies the layer to the card by screen printing.

* * * * *